Nov. 26, 1963 B. MLÁDEK ETAL 3,111,913
DEVICE FOR AUTOMATIC PRODUCTION OF BAKER'S WARE
Filed Oct. 21, 1960 2 Sheets-Sheet 2
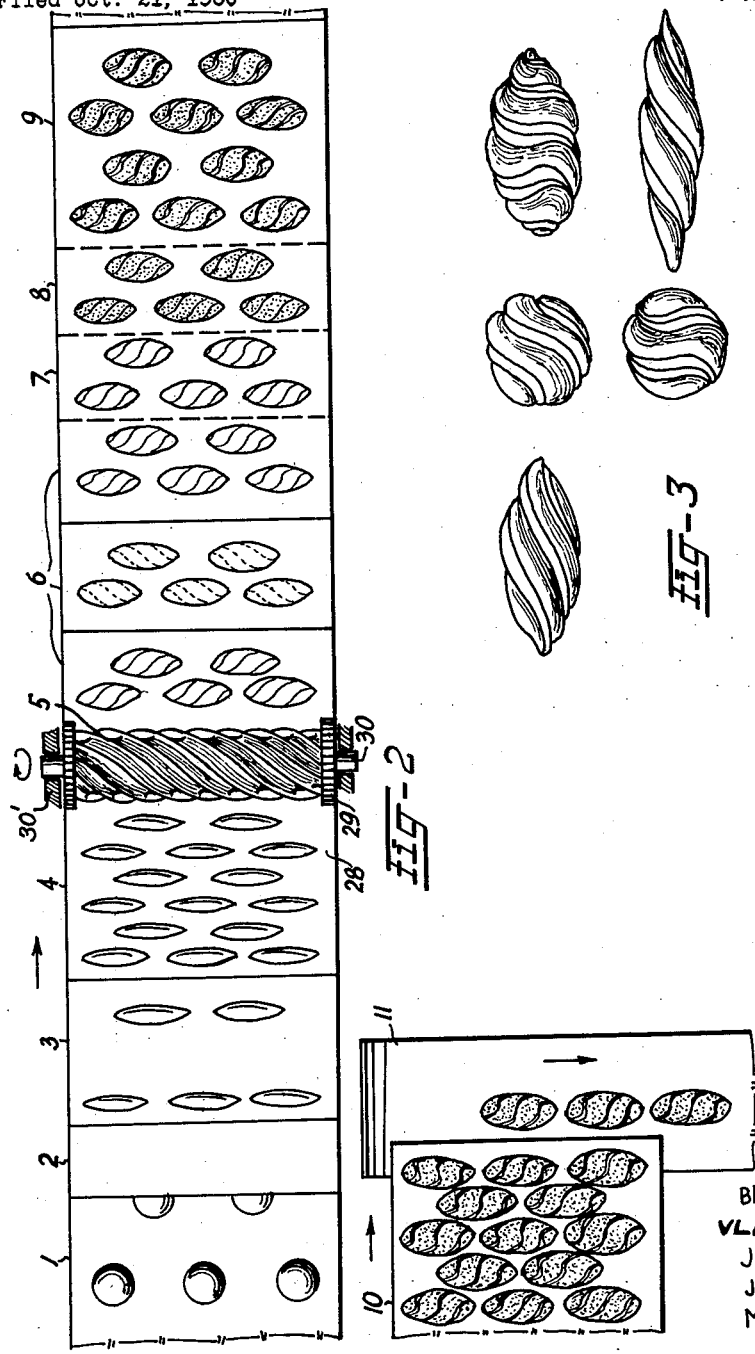
BEDŘICH MLÁDEK
VLASTISLAV KONOPÍK
JAN VODRÁŽKA
JIŘÍ JINDŘICH
MIROSLAV LAMAČ
INVENTORS
BY
AGENT 3,111,913
DEVICE FOR AUTOMATIC PRODUCTION OF BAKER'S WARE
Bedřich Mládek, Vlastislav Konopík, and Jan Vodrážka, Prague, Jiří Jindřich, Cernosice, and Miroslav Lamač, Kunratice, Czechoslovakia, assignors to Zavody Potravinarskych a chladicich stroju narodni podnik, Pardubice, Czechoslovakia
Filed Oct. 21, 1960, Ser. No. 65,558
5 Claims. (Cl. 107—4)

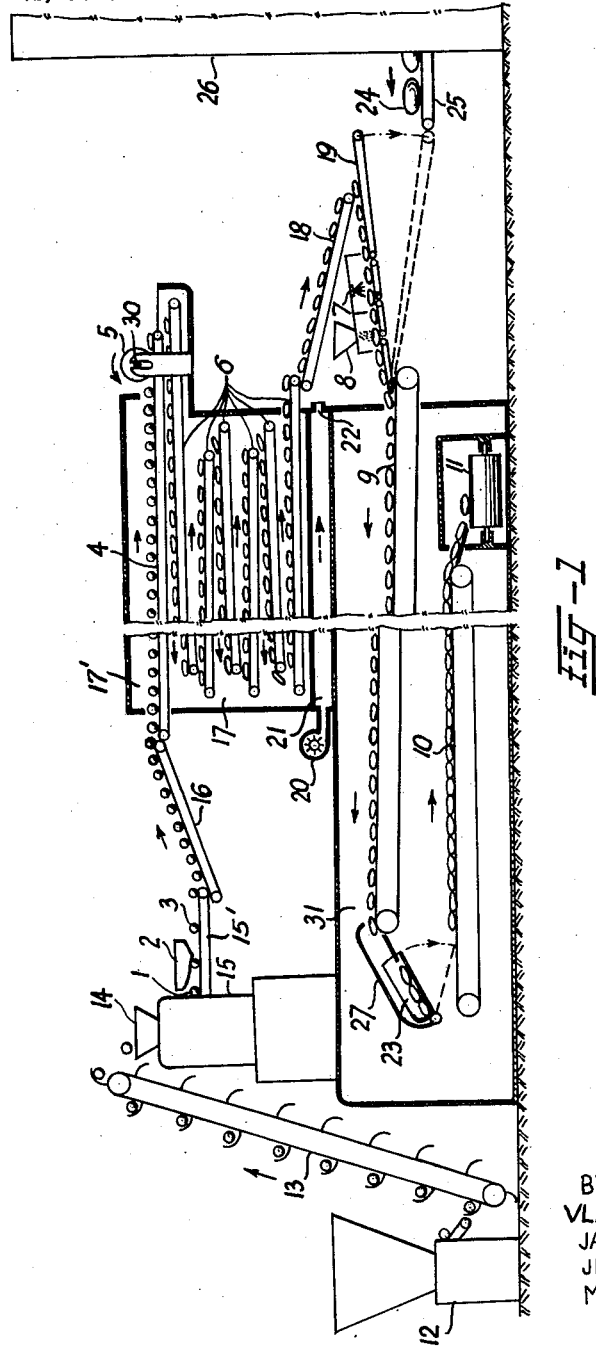

The invention relates to a device for automatically producing baked goods.

The general object of this invention is to provide means for eliminating difficulties and drawbacks of earlier baking apparatus of the type wherein the dough is divided into portions, shaped into suitable loaves, allowed to rise in a proofing chamber, and finally baked to form the finished product. The aforementioned steps are carried out continuously by a production line which allows easy survey and optimum utilization of the space in which the production line is placed. One of the main features of the invention is the provision of means for embossing the dough pieces as they pass through the proofing chamber, this arrangement making use of a special forming roller with generally helical ridges. Another feature relates to means for indirectly heating the proofing chamber from the waste heat of the baking oven in controlled manner.

The invention will be best understood from the following specification to be read in conjunction with the accompanying drawings in which:

FIG. 1 shows the overall layout of the device with its main details;

FIG. 2 illustrates the process of forming the dough in its various shapes up to the final products, the individual operational sections being designated by reference numerals which correspond to the same symbols as are used for the various parts shown in FIG. 1; and FIG. 3 shows examples of the final shapes of the completed products.

At the beginning of the production line, the dough is divided by a conventional pre-divider 12 into rough pieces, This pre-divider 12 cooperates with a supply conveyor 13 leading to the hopper 14 of a second divider 15 of a type known per se. The dough portions 1 are led by the conveyor of the divider to a conventional rolling device 2 where they are formed into small rolls 3. The conveying belt 16 adjoins the conveying belt 4 of a proofing chamber 17 at the end of which is located a forming cylinder or roller 5 which is rotatable on pins 30 and is provided with milled discs 29 adjacent the lateral edges 28 of the belt 4. The proofing chamber 17 contains a group of superposed conveying belts 6 closely stacked in staggered relationship; the rolls 3 are turned upside down, by conventional means not further illustrated, upon dropping from one belt onto the next. These belts deliver the goods to a discharge conveying belt 18 overlying a tiltable conveyor 19. Above the latter there are arranged a wetting device 7 and a powdering device 8. The rolls 3 then pass over an upper perforated belt 9 and a lower perforated belt 10 disposed one above the other in an oven 31. Between the two baking belts 9 and 10 there is arranged a mechanically tiltable tray 23 provided with a stopping comb 27 as more fully disclosed in our copending application Ser. No. 66,313 filed October 31, 1960, now Patent No. 3,084,779 issued April 9, 1963. At the outlet of the oven 31 the baking belt 11 extends transversely to the direction of travel inside the oven. After change of position, the tiltable conveyor 19 adjoins a further conveyor 25 to receive loaves 24 from another proofing chamber 26. Between the oven 31 with its two conveyor levels and the proofing chamber 17 there is arranged a ventilating space 21 with a blower 20 at one end and an air-discharge port 22 at the other.

The ripened dough is supplied to the pre-divider 12 either periodically in larger quantities from a kneading trough, or continually. This device divides the dough into regular portions, for example, into elongated pieces the weight of which is many times larger than the weight of the dough portions produced by the divider 15. These rough dough pieces, transported upwardly by means of conveyor 13, drop into the hopper 14 of the divide 15. The weight of the dough handled by the pre-divider 12 is regulated so that it equals the total weight of the dough portions produced by the divider 15 during the same time interval. The time required for conveying the roughly divided dough pieces by means of the conveyor 13 is useful from the technological point of view because the dough can rest for a while after its first division.

From the divider 15 the hardened dough portions 1 are fed over a conveying belt into the rolling device 2 which rolls out the round dough portions into rolls 3 which may have an elongated shape as shown in FIG. 2. Since the rolls 3 are retarded on the conveying belt while being formed from the portions 1, the mutual distance between the portions 1 in the conveying direction is larger than that between the rolls 3 in the conveyor 16, and during the further transport, in order to prevent their sticking together during treatment in the rolling device 2. The most economical distance between successive rolls is achieved during the further transport because the outlet conveyor 15' of the divider 15 moves faster than the further conveying system, starting with the belt 16. This belt conveys the preformed dough into the proofing chamber 17, the upper part of this chamber constituting an antechamber 17' on whose upper belt 4 the pre-formed dough rises only partly which facilitates its subsequent embossing.

The embossing is accomplished by means of the forming cylinder 5 whose journal pins 30 are borne in side member 30' in such a manner that the cylinder in rotated by its own weight as its milled discs 29 roll over the edges 28 of the conveying belt 4. The diameter of the discs 29 is larger than the diameter of the forming cylinder 5.

The surface of the forming cylinder 5 for embossing the dough rolls or other dough products has been designed so that there are provided suitable patterns, for example, threads of large pitch, coaxial wave lines and other forms which do not require that the dough rolls or that round loaves be brought into an exact position. In this manner it is possible to emboss the dough products over the whole width of the conveying belt of the antechamber 17' and to achieve attractive-looking shapes, as illustrated by some examples in FIG. 3.

This new method of forming the surface of dough pieces also allows the loaves of successive rows to be relatively staggered, as shown in FIG. 2, for the most economical use of the area of the proofing chamber and of the oven. This method also allows the forming of the rolls in a transverse position on the conveying belt, thus the rolls need not be turned through 90° after their initial formation. This position of the rolls on the conveying belt is most suitable from the point of view of transportation. This position is also convenient for a flattening of the rolls by means of the cylinder 5. The advantage of this method resides in the fact that it allows accurate deposition of the formed rolls from the conveying belt 4 upon the conveying belt 6 so that the distance between the various formed pieces does not change either in the longitudinal or in the transverse direction.

The disclosed conveying system with several conveying belts in the proofing chamber has also the advantage that when the various pieces fall from one conveying belt upon the other, they are alternately turned from the front side to the back side and vice versa. This prevents the accumulation of moisture on the back side of the dough pieces which would otherwise occur if the dough pieces remained for a longer time in one position and at the same place on the conveying belt. This would cause the dough pieces to stick together on the conveying belt and to be rolled over each other which would disturb the production process. The reversal of the dough during its rising is also advantageous from the technological point of view.

From the proofing chamber the formed and risen dough pieces reach the discharge conveyor 18 from which they drop onto the tiltable conveyor 19. The latter conveys the dough pieces under the wetting device 7 and the dressing or powdering device 8. The discharge conveyor 18 consists of several parts. Therefore, the dough pieces are transported to the wetting device 7 and to the powdering device 8 by means of separate partial conveyors which are automatically swept during the uninterrupted operation.

The dressed and formed dough pieces are then transported to the perforated conveyor 9 of the oven 31 which they traverse on two levels. On this conveyor the various pieces are baked to such an extent that they are not damaged when they slide over the tiltable tray 23. After the tray 23 has been tilted into the lower position indicated in the drawings by dotted lines, the pieces of baked articles slide on the lower conveying belt 10. To prevent the pieces from falling down from the belt 9 as the tray 23 is tilted downwards, they are stopped by the pivoted comb 27. This comb is dropped down on the belt 9 when the tray is tilted down.

During their transport on the belt 10 the various pieces are kept at small distances from each other whereby space is saved in the baking oven 31. These small distances are not detrimental from the technological point of view because the various pieces have already been pre-baked to such an extent that they cannot be baked together. From the belt 10 the baked pieces reach the final belt 11 by which they are conveyed into the transportation room. The speed of movement of this latter belt 11 is adjusted in a suitable manner so that the pieces are conveyed with larger mutual separation. This grouping of the pieces in rows allows the pieces to be counted and packed in the required numbers.

The proofing chamber 17 is arranged on the oven 31 in such a manner that the compartment 21 present between chamber 17 and the upper surface of the oven, which is ventilated by the blower 20, reduces the temperature in the proofing chamber. The overheated air is expelled from the space 21 through the port 22. The action of the blower 20 is controlled by means of a thermostat in dependence on the temperature required in the proofing chamber.

The automatic production line for small baker's ware in accordance with the invention can also be used for another purpose. After complete baking of the small pieces from chamber 17, the oven 31 can be operatively connected with the alternate proofing chamber 26. In this case the wetting device 7 is also used. In this case the conveyor system 19 is tilted toward the belt 25 which conveys loaves 24 from the continuously operating bread-proofing chamber 26. This switching allows the uninterrupted operation of the oven and its thorough use.

As will be apparent from the foregoing description, another advantage of the disclosed invention resides in the economical arrangement of the apparatus in its utilization of the heat of the baking chamber of the oven with simple regulation of the heat in the main and preliminary proofing chambers 17, 17', with consequent reduction of the area required for the apparatus.

What we claim is:

1. In apparatus for the continuous production of baked goods having means for dividing a mass of dough into a plurality of portions thereof, the combination with an oven, said oven having a baking chamber, of a proofer disposed adjacent said oven and provided with a proofing chamber directly heated thereby, a wall means defining a compartment between said baking chamber and said proofing chamber, blower means communicating with said compartment for passing an air stream through said compartment to control the transfer of heat from said baking chamber to said proofing chamber, said baking chamber constituting the sole source of heat for said proofing chamber and conveyor means for conducting said portions of dough from said dividing means successively through said proofing chamber and said baking chamber.

2. In apparatus for the continuous production of baked goods having means for dividing a mass of dough into a plurality of portions thereof, the combination with an oven, said oven having a baking chamber, of a proofer disposed above said oven and provided with a proofing chamber directly heated thereby, wall means defining a narrow horizontal compartment between said baking chamber and said proofing chamber, blower means communicating with said compartment, for passing an air stream through said compartment to control the transfer of heat from said baking chamber to said proofing chamber, said baking chamber constituting the sole source of heat for said proofing chamber, and conveyor means for conducting said portions of dough from said dividing means generally downwardly through said proofing chamber and said baking chamber in succession, said conveyor means including a plurality of stacked first conveyor belts disposed in staggered relationship within said proofing chamber, a supply conveyor belt for feeding said portions of dough onto the uppermost one of said first conveyor belts whereby said portions of dough are deposited upon successively lower ones of said first conveyor belts upon successive traverses of said proofing chamber, and at least one second conveyor belt located in said baking chamber and adapted to receive portions of dough from the lowermost one of said first conveyor belts for conducting said portions through said baking chamber.

3. In apparatus for the continuous production of baked goods having means for dividing a mass of dough into a plurality of portions thereof, the combination with an oven, said oven having a baking chamber, of a proofer disposed above said oven and provided with a proofing chamber heated thereby, wall means defining a compartment between said baking chamber and said proofing chamber, said compartment communicating with a source of fluid, means for displacing fluid from said source through said compartment to control the transfer of heat from said baking chamber to said proofing chamber, conveyor means for conducting said portions of dough from said dividing means generally downwardly through said proofing chamber and said baking chamber in succession, said conveyor means including a plurality of stacked first conveyor belts disposed in staggered relationship within said proofing chamber and a supply conveyor belt for feeding said portions of dough onto the uppermost one of said first conveyor belts whereby said portions of dough are deposited upon successively lower ones of said first conveyor belts upon successive traverses of said proofing chamber, and a forming roller extending transversely to one of said conveyor belts in said proofer for molding said portions of dough carried thereon, said forming roller having a plurality of generally helical ridges extending substantially over the entire width of the last mentioned belt.

4. In apparatus for the continuous production of baked goods having means for dividing a mass of dough into a plurality of portions thereof, the combination with an oven, said oven having a baking chamber, of a proofer disposed above said oven and provided with a proofing chamber heated thereby, conveyor means for conducting said portions of dough from said dividing means generally downwardly through said proofing chamber and said baking chamber in succession said conveyor means including a plurality of stacked first conveyor belts disposed in staggered relationship within said proofing chamber and a supply conveyor belt for feeding said portions of dough onto the uppermost one of said first conveyor belts whereby said portions of dough are deposited upon successively lower ones of said first conveyor belt upon successive traverses of said proofing chamber, and a forming roller extending transversely to one of said conveyor belts in said proofer for molding said portions of dough carried thereon, said forming roller having a plurality of generally helical ridges extending substantially over the entire width of the last-mentioned belt.

5. In apparatus for the continuous production of baked goods having means for dividing a mass of dough into a plurality of portions thereof, the combination with an oven, said oven having a baking chamber of a proofer disposed above said oven and provided with a proofing chamber directly heated thereby, wall means defining a narrow horizontal compartment between said baking chamber and said proofing chamber, blower means communicating with said compartment for passing an air stream through said compartment to control the transfer of heat from said baking chamber to said proofing chamber, said baking chamber constituting the sole source of heat for said proofing chamber, and conveyor means for conducting said portions of dough from said dividing means generally downwardly through said proofing chamber and said heating chamber in succession, said conveyor means including a plurality of stacked first conveyor belts disposed in staggered relationship within said proofing chamber, a supply conveyor belt for feeding said portions of dough onto the uppermost one of said first conveyor belts whereby said portions of dough are deposited upon successively lower ones of said first conveyor belts upon successive traverses of said proofing chamber, at least one second conveyor belt located in said baking chamber and adapted to receive portions of dough from the lowermost one of said first conveyor belts for conducting said portions through said baking chamber, and selector means interposed between said lowermost first conveyor belt and said second conveyor belt for selectively feeding portions of dough from a remote second proofing chamber onto said second conveyor belt.

References Cited in the file of this patent

UNITED STATES PATENTS

| | | |
|---|---|---|
| 955,514 | Joern | Apr. 19, 1910 |
| 1,345,079 | Fisch | June 29, 1920 |
| 1,369,724 | Benz | Feb. 22, 1921 |
| 1,457,352 | Dreher | June 5, 1923 |
| 1,888,308 | Coffaro | Nov. 22, 1932 |
| 2,104,282 | Wagner et al. | Jan. 4, 1938 |
| 2,119,910 | Ferry | June 7, 1938 |
| 2,648,298 | Holbeck | Aug. 11, 1953 |
| 2,709,412 | Eagerman | May 31, 1955 |
| 2,942,562 | Luc | June 28, 1960 |

FOREIGN PATENTS

| | | |
|---|---|---|
| 1,059,373 | Germany | June 18, 1959 |